United States Patent [19]

Brown

[11] Patent Number: 4,915,275
[45] Date of Patent: Apr. 10, 1990

[54] MULTI-PURPOSE STABILIZING CLEATS FOR AUTOMOBILE HUMP MOUNTED TRAY

[76] Inventor: Wilbur C. Brown, P.O. Box 2690, San Angelo, Tex. 76902

[21] Appl. No.: 266,870

[22] Filed: Nov. 3, 1988

[51] Int. Cl.$^4$ .............................................. B60R 7/00
[52] U.S. Cl. .............................. 224/42.42; 248/205.3; 248/188.7; 248/188.8; 248/688
[58] Field of Search .................. 224/42.42, 275, 42.11, 224/901; 248/205.3, 231.5, 188.6, 188, .7, 188.8, 359 E, 359 A

[56] References Cited

U.S. PATENT DOCUMENTS

| | | | |
|---|---|---|---|
| 1,570,564 | 1/1926 | Hamel | 248/188.8 |
| 2,969,900 | 1/1961 | Hueler . | |
| 3,269,555 | 3/1964 | Henderson | 224/42.42 R |
| 3,315,798 | 4/1967 | Mathison | 224/42.42 R |
| 3,393,846 | 7/1968 | Cannon et al. | 224/42.42 R |
| 3,561,589 | 2/1971 | Larkin et al. . | |
| 3,800,939 | 4/1974 | Cornelius | 224/275 |
| 4,010,696 | 3/1977 | Priesman . | |
| 4,143,800 | 3/1979 | McCaffrey . | |
| 4,371,138 | 2/1983 | Roberts | 248/231.5 |
| 4,524,701 | 6/1985 | Chappell | 224/275 |

Primary Examiner—Linda J. Sholl
Attorney, Agent, or Firm—Fleit, Jacobson, Cohn, Price, Holman & Stern

[57] ABSTRACT

Multi-purpose, adjustable stabilizing cleats which can be attached to various types of transmission and/or drive shaft tunnel or hump mounted trays with adjustment of the cleats enabling them to be positioned for effective engagement with surface areas of transmission humps or tunnels of different shapes and configurations. The cleats can also be attached to other objects for engaging carpeted surfaces, upholstered furniture and the like.

6 Claims, 1 Drawing Sheet

MULTI-PURPOSE STABILIZING CLEATS FOR AUTOMOBILE HUMP MOUNTED TRAY

BACKGROUND OF THE INVENTION

1. Field of the Invention

The present invention generally relates to a structure for stabilizing a tray supported on the transmission and/or drive shaft tunnel or hump normally found in most automotive vehicles and more particularly to multi-purpose, adjustable stabilizing cleats which can be attached to various types of existing hump mounted trays with adjustment of the cleats enabling them to be positioned for effective engagement with surface areas of transmission humps or tunnels of different shapes and configurations. The cleats can also be attached to other objects for engaging carpeted surfaces, upholstered furniture and the like.

2. Information Disclosure Statement

Trays for supporting beverages, coins, cigarettes and other articles in accessible position for the operator and passengers of automotive vehicles are well-known. Such trays usually include a bottom surface that is shaped to straddle and engage the transmission and/or drive shaft hump or tunnel formed in the floorboard of an automotive vehicle. Known trays usually employ a structure, such as serrations, depending projections or similar arrangements to frictionally engage the surfaces of the tunnel or hump to retain the tray and the articles therein properly supported. U.S. Pat. Nos. 2,969,900, 3,561,589, 4,010,696 and 4,143,800 disclose trays of this general type.

SUMMARY OF THE INVENTION

An object of the present invention is to provide stabilizing cleats for automobile hump mounted trays which are adjustably secured to a tray and project beyond the periphery of the tray to effectively engage hump surfaces of various automotive vehicles in which the surfaces vary substantially as to shape and dimensions.

Another object of the invention is to provide stabilizing cleats in accordance with the preceding object in which the cleats have attaching structure which enables them to be easily and quickly attached to various types of trays with each cleat including an elongated arm structure having laterally extended pointed projections thereon for gripping engagement with carpet, rubber floor mats, various upholstery materials and other supporting surface thereby enabling the cleats and trays to which they are attached to be used for various purposes in addition to being mounted on an automotive vehicle hump such as stable support of a tray from a carpeted floor, upholstered furniture arms and the like.

A further object of the invention is to provide stabilizing cleats in accordance with the preceding objects in which the arm terminates in a cylindrical end having a laterally facing surface with radial serrations for engagement with a mounting member of cylindrical configuration having radial serrations with the mounting member including an adhesive material on the surface opposite to the serrations for adhesively mounting the mounting member on the tray to be supported with a bolt and wing nut assembly interconnecting the cylindrical end on the arm and the cylindrical mounting member to retain the radial serrations in interlocked and adjusted position thereby enabling the arms of the cleats to be rotatably adjusted to vary their angular relationship to the tray being supported.

Still another object of the invention is to provide adjustable stabilizing cleats for trays or other objects to enable the cleats to be utilized for multiple purposes with the adjustable cleats being simple in construction, easily attached to trays or other objects and effective in stable support of the tray or object to which it is attached.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
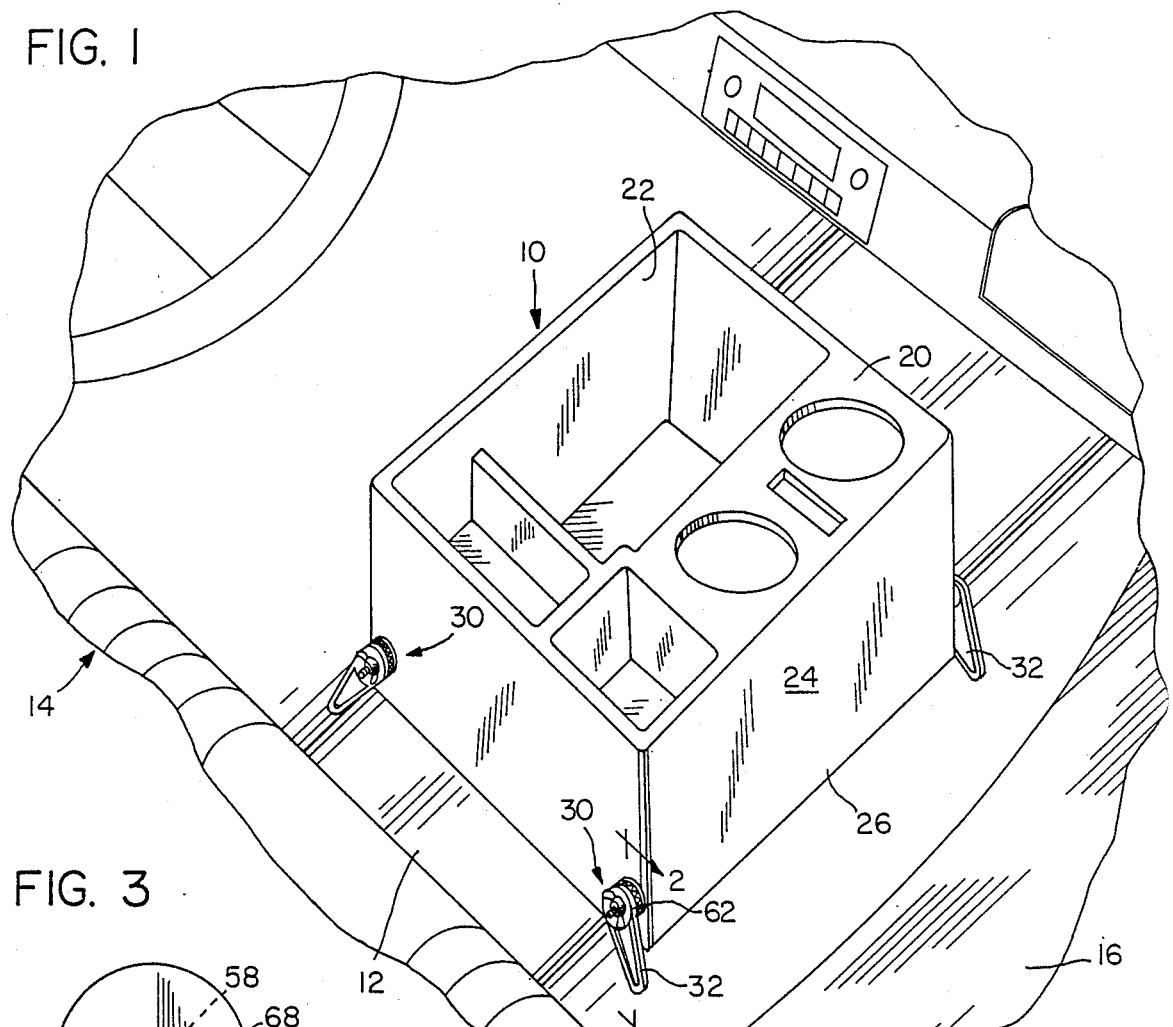
FIG. 1 is a perspective view illustrating a tray with the adjustable cleats of the present invention attached thereto illustrating the manner in which the cleats support the tray from the transmission hump or tunnel of an automotive vehicle.
Figure 3:
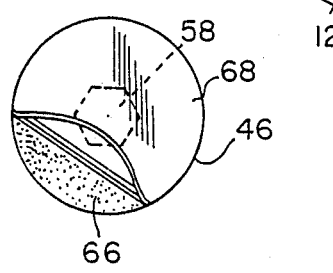
FIG. 3 is an elevational view of the mounting member illustrating the peel-off adhesive on the face of the mounting member for mounting the mounting member on the tray.

Referring specifically to FIG. 1, a tray 10 is illustrated in supported relation on the transmission and/or drive shaft tunnel or hump 12 in an automotive vehicle 14 in which the tunnel or hump extends longitudinally in the central area of the floorboard 16 and includes inclined side surfaces 18 which may be covered with a rubber floormat, carpeting or the like. The tray 10 includes a top surface 20 with compartments 22 therein for supporting various items such as beverages in containers, cigarettes, coins and the like. Also, the tray 10 includes a generally vertically disposed peripheral wall 24 having a lower edge 26 engaged with the tunnel or hump 12 in a conventional and well-known manner. The wall 24 usually defines a rectangular or square structure and the number of compartments as well as the shape and size of the compartments may vary. Each corner of the peripheral wall at the front and rear portions of the tray has an adjustable cleat 30 of the present invention mounted thereon with the cleats 30 engaging the inclined surfaces 18 to provide a stable support for the tray 10 in a manner set forth in more detail hereinafter.

Figure 4:
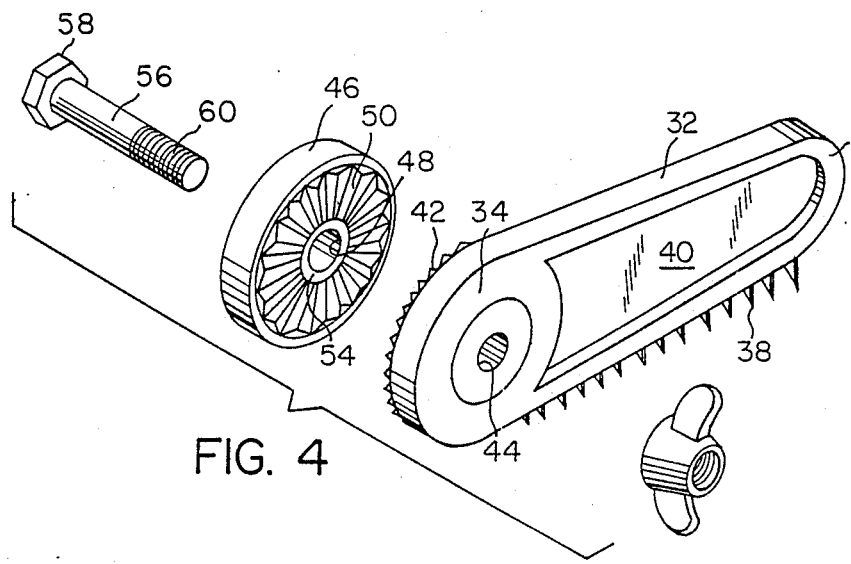
FIG. 4 is an exploded, group perspective view of an adjustable cleat.

As illustrated in FIG. 4, each cleat 30 includes an elongated arm 32 that tapers from a generally cylindrical mounting end 34 to a rounded outer end 36 with the side surfaces of the arm 32 tapering from a larger diameter end 34 towards a smaller radius outer end 36. One elongated side surface of the arm 32 is provided with a plurality of pointed projections 38 which form stabilizing points for gripping and adhering to various surfaces such as the rubber mat or carpet covering the inclined surface 18. The projections or points 38 are substantially conical in configuration and may vary in shape, size and spacing to provide adherence to the shape or texture of the supporting surface 18. The elongated central portion of the arm 32 is of reduced thickness as at 40 whereas the edge portion of the arm is of greater thickness for rigidity.

The cylindrical mounting end 34 of the arm 32 includes a serrated face 42 in which the serrations extend radially from a central aperture 44 with the ridges and valleys of the serrations extending radially so that the peripheral distance between the points on the ridges are circumferentially spaced a greater distance at their outer ends as compared to their inner ends. The arm 32 is preferably constructed of plastic material that can be moulded or otherwise constructed in a relatively inexpensive manner.

Figure 2:
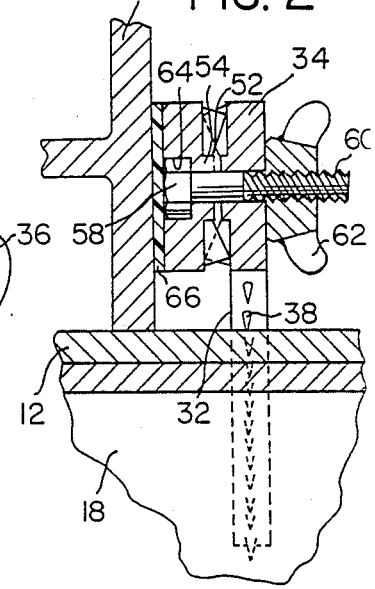
FIG. 2 is a vertical, sectional view, on an enlarged scale, taken along section line 2—2 on FIG. 1 illustrating the specific structural details of one of the adjustable cleats.

Each cleat 30 also includes a cylindrical mounting member 46 having a central aperture 48 therein with the diameter of the cylindrical mounting member 46 being substantially the same as the diameter of the cylindrical mounting end 34 on the arm 32 as illustrated in the drawings. The cylindrical mounting member 46 includes radial serrations 50 in which the ridges and valleys extend radially from the periphery of the central aperture 48 and are constructed to engage and interlock with the serrations 42 on the cylindridal end 34 on the arm 32. As illustrated in FIGS. 2 and 4, the central apertures 44 and 48 include a projecting cylindrical boss 52 on the cylindrical end 34 and a similar boss 54 on the cylindrical mounting member 46 with the ridged forming the serrations tapering radially from the outer edge of the respective bosses 52 and 54 for effective interlocking engagement when the mounting member 46 and the cylindrical mounting end 34 of the arm 32 are assembled and clamped together by a bolt 56 having a head 58 and a threaded portion 60 which receives a wing nut 62. The face of the cylindrical mounting member 46 opposite the surface having the boss 54 thereon is provided with a recess 64 shaped and sized to closely receive the polygonal head 58 of the bolt 56 to prevent the bolt 56 from rotating when the wing nut 62 is tightened and loosened. By tightening and loosening the wing nut 62, the angular position of the arm 32 in relation to the cylindrical mounting member 46 may be varied about the axis defined by the bolt 56 with the serrations serving to securely lock the arm in adjusted position when the wing nut 62 is tightened.

In order to mount the mounting member 46 on the end corner surfaces of the wall 28, an adhesive coating 66 is provided on the face of the cylindrical mounting member opposite the face having the serrations 50 thereon so that the adhesive coating 66 will adhere to the surface of the wall 24 in a secure manner as illustrated in FIG. 2. The adhesive surface is provided with a peel-off protective sheet 68 which protects the adhesive coating 66 in a well-known manner prior to the mounting member or attachment head 46 being mounted on the surface of the tray.

The structure of the adjustable cleats 30 enables them to be quickly and easily attached to the exterior surface of a hump mounted tray or any other tray or object desired to be supported in a stable and secure manner. By simply peeling off the protective cover for the adhesive, the mounting member or attachment head 46 may be securely and adhesively mounted on the surface of the tray or other object. This mounting procedure may be carried out with the cleat completely assembled with it only then being necessary to loosen the wing nut to enable the arm 32 to be adjusted to the desired position so that the projections or points 38 are engaged with the supporting surface after which the wing nut can be tightened. The projecting points 38 will effectively grip, adhere to and in some instances partially penetrate the supporting surface and will be effective to support a tray or other object on various surfaces including a rubber mat covering the floorboard area including the tunnel or hump, carpeted surfaces in an automotive vehicle, other carpeted surfaces such as floor surfaces and the like and also upholstered surfaces thereby enabling the adjustable cleats to be utilized effectively for many purposes in supporting various objects from various surfaces. The mounting member or attachment head may also be constructed of plastic material with the bolt and wing nut being of metal or also constructed of plastic material which will retain the costs of the adjustable cleats to a desired minimum.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A stabilizing cleat for attachment to an article to be supported from a supporting surface comprising a mounting member having a surface adapted to engage a surface of an object to be supported, means securing the mounting member to the surface of an object to be supported, an arm extending laterally from the mounting member, means rotatably connecting the mounting member to the arm for pivotal movement of the arm about an axis perpendicular to the longitudinal axis of the arm, and a plurality of projecting points on the arm to grippingly engage a supporting surface to provide a stable support for the object, said means connecting the arm to the mounting member including opposed faces on the mounting member and arm with each of said faces including radial serrations defined by radially extending ridges and valleys which interlockingly engage when forced into contact and a bolt and nut assembly extending through the mounting member and arm for tightening and loosening to releasably secure the serrations in interlocking engagement to enable the arm to be adjusted to angular position when the bolt and nut is loosened and securely locked in place after adjustment, said bolt including a head countersunk into the surface of the mounting member that is adapted to engage the surface of an object to be supported, said nut being a wing nut disposed externally of the arm to enable manipulation thereof.

2. The structure as defined in claim 1 wherein said projecting points are substantially conical points projecting from at least one elongated side edge of the arm in perpendicular relation thereto for engaging a supporting surface.

3. The structure as defined in claim 2 wherein said means securing the mounting member to the surface of an object to be supported includes an adhesive on a surface of the mounting member for adhesively adhering the mounting member to the object to the supported.

4. In combination with a tray supported above the transmission/drive shaft hump of an automotive vehicle in which the hump includes inclined side surfaces and the tray includes a peripheral surface, a plurality of cleats mounted on the peripheral surface of the tray and extending laterally and downwardly from the tray to supportingly engage with the inclined surfaces of the hump thereby providing a stable support for the tray on the hump, each adjustable cleat comprising an attachment head having opposed surfaces with one of the surfaces including an adhesive coating for securing the attachment head to the peripheral surface of the tray, the other surface of the attachment head including radial serrations, each cleat also including an elongated arm having an end portion with radial serrations thereon for engagement with the serrations on the attachment head, fastening means interconnecting the attachment head and end portion of the arm to secure the arm in adjusted position about an axis perpendicular to the peripheral surface of the tray to enable the arm to be swung to an adjusted position and locked in place, said arm including a plurality of projecting points on a peripheral edge thereof engaged with the inclined surface of the hump to provide a stable support for the tray, said fastening means including a nut and bolt with the nut having a head recessed in the surface of the attachment head having the adhesive coating thereon and the nut is a wing nut engaged with the surface of the end portion of the arm opposite to that having the serrations thereon, said arm tapering outwardly and being pivotal about an axis perpendicular to the surface of the tray with the edge of the arm having the projecting points thereon facing downwardly and engaging the inclined surface of the hump to provide supporting engagement with the hump outwardly of the peripheral surface of the tray to provide a stable support for the tray.

5. For use in combination with a tray supported above the transmission/drive shaft hump of an automotive vehicle in which the hump includes inclined side surfaces and the tray includes a peripheral surface formed by opposed, generally vertical walls, a plurality of cleats adapted to be mounted on the peripheral surface of the tray for extending laterally and downwardly from the tray to supportingly engage the inclind side surfaces of the hump and provide a stable support for the tray on the hump, each cleat comprising an attachment head having opposed surfaces with one of the surfaces including an adhesive coating for securing the attachment head to the peripheral surface of the tray, the other surface of the attachment head including radial serrations, each cleat also including an elongated arm having an end portion with radial serrations thereon for engagement with the serrations on the attachment head, fastening means interconnecting the attachment head and end portion of the arm to secure the arm in adjusted position about an axis perpendicular to the peripheral surface of the tray to enable the arm to be swung in a vertical plane to an adjusted position and locked in place, said arm tapering outwardly and including a plurality of projecting points on a downwardly facing peripheral edge thereof for engagement with the inclined side surface of the hump to provide supporting engagement with the hump outwardly of the peripheral surface of the tray to provide a stable support for the tray.

6. The structure as defined in claim 5 wherein said fastening means includes a threaded member rigid with said attachment head and extending through said end portion of the arm having radial serrations thereon, and a manually manipulated nut threaded onto the outer end of the threaded member for tightening and loosening the serrations to enable secure locking of the arm in adjusted position.

* * * * *